Nov. 9, 1954     C. E. SWENSON     2,693,868
ONE-WAY CLUTCH
Filed April 26, 1951
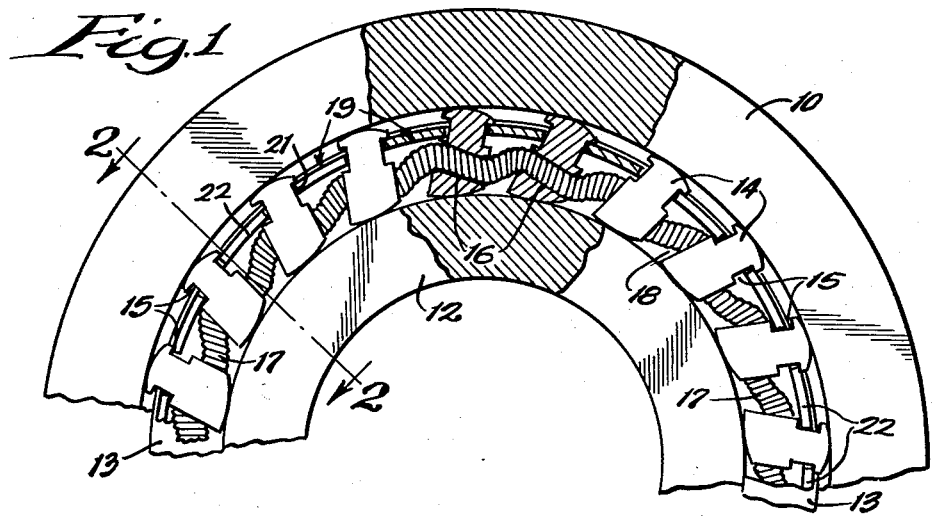
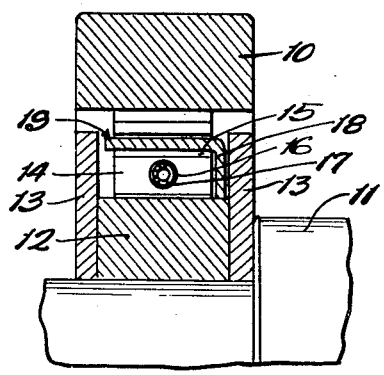
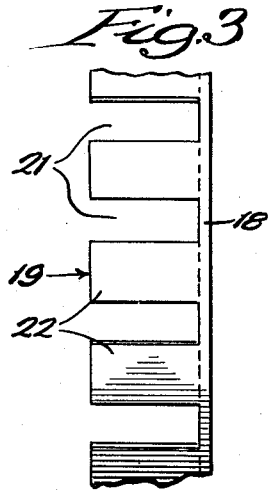
INVENTOR:
Carl E. Swenson,
BY
E. A. Booth,
ATTORNEYS.

United States Patent Office 2,693,868
Patented Nov. 9, 1954

2,693,868
ONE-WAY CLUTCH

Carl E. Swenson, Rockford, Ill., assignor to Borg-Warner Corporation, Chicago, Ill., a corporation of Illinois Application April 26, 1951, Serial No. 223,040

7 Claims. (Cl. 192—45.1)

This invention relates to one way clutches and more particularly to a cage construction for a one way clutch of the tilting gripper type.

It is one of the objects of the invention to provide a one way clutch in which the grippers can easily be assembled in and disassembled from the cage.

According to one feature of the invention, the grippers fit into open ended slots in the cage and are formed with grooves in their faces to receive the edge portions of bars defining the slots. With this construction the grippers can be slipped axially into assembled position in the cage and can easily be slipped out to disassemble the clutch when desired.

Another object is to provide a one way clutch in which the cage is formed to engage grooves in the grippers to hold them assembled with the cage and to limit tilting movement thereof. In the preferred construction, axially extending bars on the cage fit loosely into grooves in the faces of the grippers to limit both radial movement and tilting thereof.

Still another object is to provide a one way clutch in which axially extending bars on the cage overlie and protect an annular tilting spring threaded through the grippers.

The above and other objects and advantages of the invention will be more readily apparent from the following description when read in connection with the accompanying drawing, in which:

Figure 1 is a partial end elevation of a one way clutch embodying the invention with parts broken away and in section;

Figure 2 is a section on the line 2—2 of Figure 1; and

Figure 3 is a partial elevation of the cage.

The clutch, as shown, is adapted to connect an annular outer race 10 to a shaft 11 for rotation together in one direction and for free relative turning in the opposite direction. As shown, the shaft 11 carries an annular inner race 12 which is fixed to the shaft. Preferably, rings 13 fit against the ends of the inner race and partially enclose the space between the races to hold the clutch assembly in position.

The clutch comprises a series of tiltable grippers 14 mounted between the races and formed with their ends curved about spaced centers so that when they are tilted counterclockwise they will grip the races and connect them drivably and when they are tilted clockwise they will release the races for free relative rotation. Each of the grippers has its opposite faces flat and parallel and formed with grooves 15 extending axially across the faces thereof for cooperation with the cage.

The grippers are formed with angular bores 16 therethrough, through which there is threaded an annular coil spring 17. This construction, as more particularly described and claimed in my Patent No. 2,386,013, tends to tilt the grippers toward their engaged position so that they will engage the races uniformly and quickly whenever the races tend to rotate in the engaging direction relative to each other.

The grippers are held assembled and are limited in their tilting movements by a cage which is formed according to the present invention of a single strip of sheet material such as steel. As shown, the strip is provided with a flat annular end ring portion 18 and with an axially extending flange indicated generally at 19 projecting axially from the outer edge of the end ring 18. The flange 19 is formed with a series of open ended slots 21 which are separated by spaced bars 22 which are preferably wider circumferentially than they are thick radially. Preferably also, the thickness of the bars 22 is substantially less than the radial width of the grooves 15.

The grippers are assembled with the cage by aligning the respective grippers with the slots 21 so that the grooves 15 lie in registry with the bars 22 and pressing the grippers axially toward the end ring 18. The spring 17 lies radially inward from the grooves 15 so that in the final assembly, it will be positioned within the flange 19 to be protected thereby during handling. With the grippers in this position radial movement thereof relative to the cage will be limited by engagement of the ends of the grooves 15 with the bars 22 so that the grippers are held assembled with the cage. When the assembly is mounted between the race members, tilting of the grippers will be limited by engagement of opposite ends of the grooves on opposite sides of each gripper with the adjacent bars 22 as indicated in Figure 1. This will prevent excessive tilting of the grippers which might damage the spring 17 particularly in the releasing direction so that the spring will remain effective over a long period of time to control operation of the grippers.

During normal use, disassembly of the clutch unit is prevented by elements such as the ring 13 which position the clutch between the races. However, if it should be desired to disassemble the parts at any time for repair or replacement purposes the grippers can easily be slipped from the cage. It will be seen that the cage can conveniently be formed from a single continuous strip so that it is very inexpensive and is light weight and compact.

While one embodiment of the invention has been shown and described in detail, it will be understood that this is illustrative only and is not definitive of the scope of the invention, reference being had for this purpose to the appended claims.

What is claimed is:

1. A one way clutch comprising a series of tiltable grippers in annular array, each having axially extending grooves in its faces, and a cage having an annular end ring and a plurality of spaced bars extending axially from the end ring and separated at their ends to receive the grippers between them with the edges of the bars extending into the grooves.

2. A one way clutch comprising a series of tiltable grippers in annular array, each having axially extending grooves in its faces, and a cage having an annular end ring and a plurality of spaced bars extending axially from the end ring and separated at their ends to receive the grippers between them with the edges of the bars extending into the grooves, the grooves being wider than the thickness of the bars whereby the grippers can have limited radial and tilting movement.

3. A one way clutch comprising a series of tiltable grippers in annular array, each having axially extending grooves in its faces, and a cage formed of sheet material having an end portion and a plurality of spaced integral bars extending axially from the end portion and separated at their ends, and being wider circumferentially than they are thick radially, the grippers fitting between the bars with the edges of the bars extending into the grooves in the faces of the grippers.

4. A one way clutch comprising a series of tiltable grippers in annular array, each having axially extending grooves in its faces, and a cage formed of sheet material having a substantially flat annular end ring and an axially extending flange projecting from the outer edge of the end ring, the flange having a series of open ended slots therein of a width to receive the grippers with the edges of the flange defining the slots extending into the grooves in the faces of the grippers.

5. A one way clutch comprising a series of tiltable grippers in annular array, each gripper having flat faces with axially extending grooves therein and a central opening therethrough between the faces, an annular spring threaded through the openings and bent thereby so that it tends to tilt the grippers in one direction and a cage having an end ring and a series of spaced bars extending axially therefrom and of less radial thickness than the width of the grooves, the grippers fitting between the bars with the spring lying radially within the bars and with the edges of the bars extending loosely into the grooves.

6. A one way clutch comprising a series of tiltable grippers in annular array, each gripper having flat faces with axially extending grooves therein and a central opening therethrough between the faces, an annular spring threaded through the openings and bent thereby so that it tends to tilt the grippers in one direction, and a cage formed of sheet material having a substantially flat annular end ring and an axial flange extending from the outer edge of the end ring, the flange having a series of open ended slots therein of a width to receive the grippers with the edges of the flange which define the slots extending into the grooves and with the spring lying radially within the flange.

7. A one way clutch comprising a series of tiltable grippers in annular array, each of the grippers having a groove extending axially across at least one of its faces, and a cage having an annular end ring and a plurality of spaced bars extending axially from the end ring and separated at their ends to receive the grippers between them with at least one edge of each of the bars extending into a groove in a gripper.

References Cited in the file of this patent

UNITED STATES PATENTS

| Number | Name | Date |
| --- | --- | --- |
| 2,366,843 | Dodge | Jan. 9, 1945 |
| 2,386,013 | Swenson | Oct. 2, 1945 |